United States Patent [19]

Gowdy et al.

[11] 4,325,936

[45] Apr. 20, 1982

[54] METHOD FOR REMOVING HYDROGEN SULFIDE FROM GAS STREAMS

[75] Inventors: Hugh W. Gowdy, Irvine; Donald M. Fenton, Anaheim, both of Calif.

[73] Assignee: Union Oil Company of California, Brea, Calif.

[21] Appl. No.: 233,888

[22] Filed: Feb. 12, 1981

Related U.S. Application Data

[63] Continuation-in-part of Ser. No. 50,193, Jun. 20, 1979, abandoned.

[51] Int. Cl.$^3$ .............................................. C01B 17/05
[52] U.S. Cl. ..................... 423/573 R; 423/226; 423/571
[58] Field of Search .................... 423/226, 571, 573

[56] References Cited

U.S. PATENT DOCUMENTS

| | | | |
|---|---|---|---|
| 2,163,169 | 6/1939 | Gollmar | 423/227 |
| 2,259,901 | 10/1941 | Matheson | 423/227 |
| 2,472,473 | 6/1949 | Fetterly | 423/573 |
| 2,819,950 | 1/1958 | Patton | 423/573 |
| 2,911,438 | 11/1959 | Szombathy | 260/512 |
| 3,087,793 | 4/1963 | Hay | 423/573 |
| 3,459,495 | 8/1969 | Iida et al. | 423/226 |
| 3,764,548 | 9/1973 | Redmore | 252/188 |
| 3,810,833 | 5/1974 | Nicklin | 210/32 |
| 3,812,243 | 5/1974 | Landrum et al. | 423/574 |
| 3,928,535 | 12/1975 | Schulz | 423/224 |
| 3,937,795 | 2/1976 | Hasebe | 423/573 |
| 3,959,452 | 5/1976 | Espenscheid et al. | 423/573 |
| 3,972,989 | 8/1976 | Fenton et al. | 423/573 |
| 3,978,137 | 8/1976 | Frame | 260/608 |
| 4,002,727 | 1/1977 | Sonoda et al. | 423/573 |
| 4,009,251 | 2/1977 | Meuly | 423/573 |
| 4,017,594 | 4/1977 | Fenton et al. | 423/573 |
| 4,049,776 | 9/1977 | Nicklin et al. | 423/226 |
| 4,060,594 | 11/1977 | Fenton et al. | 423/573 |
| 4,083,945 | 4/1978 | Fenton et al. | 423/573 |
| 4,118,467 | 10/1978 | Sano et al. | 423/573 |
| 4,206,194 | 6/1980 | Fenton et al. | 423/573 |
| 4,276,187 | 6/1981 | Sakai et al. | 423/573 R |

FOREIGN PATENT DOCUMENTS

| | | |
|---|---|---|
| 50-8296 | 9/1975 | Japan . |
| 53-40600 | 8/1978 | Japan . |
| 948270 | 4/1964 | United Kingdom . |
| 1504706 | 3/1978 | United Kingdom . |

OTHER PUBLICATIONS

Riesenfeld, F. C., and Kohl, A. L., *Gas Purification*, Second Edition, 1974, Chapter 9, pp. 398-451.

*Primary Examiner*—G. O. Peters
*Attorney, Agent, or Firm*—Dean Sandford; Daniel R. Farrell

[57] ABSTRACT

A hydrogen sulfide removal and conversion method in which a hydrogen sulfide-containing gas stream is contacted with a regenerable washing solution containing solubilized vanadium thiocyanate ions, a carboxylate complexing agent and one or more water-soluble quinones capable of solubilizing tetravalent vanadium. The molar ratio of vanadium to quinone(s) in the washing solution is selected to substantially reduce or eliminate the formation of contaminant sulfate salts. The absorbed hydrogen sulfide is converted to elemental sulfur which, after oxidative regeneration of the washing solution, is separated from the regenerated solution.

30 Claims, 3 Drawing Figures

METHOD FOR REMOVING HYDROGEN SULFIDE FROM GAS STREAMS

RELATED APPLICATION

This is a continuation-in-part of application Ser. No. 50,193, filed June 20, 1979, now abandoned.

BACKGROUND OF THE INVENTION

1. Field of the Invention

This invention relates to the removal of hydrogen sulfide from gas streams by contacting the gas with an aqueous washing solution, and more particularly to an improved method for the removal of hydrogen sulfide from gas streams in which the undesirable formation of water-soluble surlfur-containing salts and the undesirable chemical consumption of the constituents of the washing solution are substantially reduced.

2. Description of the Prior Art

With the increasing concern over the pollution of the atmosphere, great demands have been made on industry to produce pollution-free products in a pollution-free manner. One area of particular concern has been the release of sulfur and its compounds into the atmosphere as a result of the refining of petroleum, the sweetening of sour natural gas, the processing of ores, the destructive distillation of coal and/or oil shale, the gasification or liquefaction of coal, the use of geothermal fluids to generate electricity, or other processes which produce hydrogen sulfide-containing gases.

Various processes have been employed to remove hydrogen sulfide from gas streams. The Stretford process and the Takahax process employ aqueous alkaline washing solutions to absorb the hydrogen sulfide from the gas stream and to convert the absorbed hydrogen sulfide primarily to sulfur. The solution is regenerated by flowing air through the solution. The product sulfur is separated from the regenerated solution before recycling the solution to the absorber. The washing solution employed in the Stretford process contains a water-soluble salt of 9,10-anthraquinone disulfonic acid (ADA) and a water-soluble vanadate or other multivalent metal compound. The washing solution employed in the Takahax process contains a water-soluble naphthoquinone sulfonate (NQS) alone or in combination with a multivalent metal compound. While these processes are successful in substantially reducing the hydrogen sulfide content of the gas streams being treated, several problems exist which tend to increase their operating expenses. One such problem involves the chemical consumption of the washing solution constituents, such as ADA, NQS and/or the alkaline constituents of the solution. The cost of chemicals required to replenish the supply of these consumable constituents adds significantly to the cost of the process. Another of the problems involves the undesirable conversion of the absorbed hydrogen sulfide and/or the product sulfur to water-soluble sulfur-containing salts, such as sulfates, thiosulfates and polythionates which accumulate in the washing solution. These accumulated salts tend to (1) increase the corrosivity of the washing solution, (2) cause precipitation of the desired constituents of the washing solution and (3) increase the rate of chemical consumption of the alkaline constituents of the washing solution.

In commercial plants employing these processes, attempts have been made to mitigate these problems either by periodic replacement of the washing solution or by intermittently or continuously bleeding a slipstream of the contaminated washing solution while adding make-up chemicals to replenish the circulating solution. Both procedures are unsatisfactory due to the expense of the make-up chemicals and the difficulty involved in disposal of the contaminated solution.

It has been proposed to modify the washing solution of the Stretford process in order to reduce the chemical consumption of ADA, such as by adding to the conventional Stretford solution a thiosulfate ion precursor (U.S. Pat. No. 3,972,989 to Fenton et al.), a thiocyanate ion precursor (U.S. Pat. No. 4,017,594 to Fenton et al.), or a water-soluble inorganic fluoride, borate or phosphate complexing agent (U.S. Pat. No. 4,060,594 to Fenton et al.). It has also been proposed to modify the process steps of the Stretford process in order to reduce the undesirable formation of water-soluble sulfur-containing salts, such as by the use of multistage absorbers (U.S. Pat. No. 4,125,597 to Fleck) or an oxygen-stripping device (U.S. Pat. No. 3,642,448 to Beavon) to remove oxygen from the washing solution before it is contacted with the hydrogen sulfide-containing gas stream. It has also been proposed to selectively separate the undesirable water-soluble sulfur-containing salts from the washing solution in order to reduce the contaminant concentration, such as by the addition of a water-soluble aldehyde to the solution to convert the thiosulfate salts to sulfate salts which are then separated from the solution by cooling the solution to selectively precipitate the sulfate salts. (U.S. Pat. No. 4,083,945 to Fenton et al.)

While the aforementioned modifications have been somewhat successful in reducing one or more of the problems associated with the Stretford process, these modifications have not been entirely satisfactory in all instances. Thus a need exists for a hydrogen sulfide removal process which has all the beneficial features of the Stretford process but which substantially eliminates the aforementioned problems.

Accordingly, a primary object of this invention is to provide a method for removing hydrogen sulfide from gas streams.

Another object of this invention is to provide a hydrogen sulfide removal method in which the hydrogen sulfide content of the gas being treated is reduced to an acceptably low level at a reasonable cost.

Still another object of this invention is to provide a method for removing hydrogen sulfide from gas streams in which the absorbed hydrogen sulfide is converted substantially exclusively to sulfur and wherein the undesirable conversion of hydrogen sulfide and/or the product sulfur to water-soluble sulfur-containing salts is substantially reduced or eliminated.

Yet another object of this invention is to provide a method in which hydrogen sulfide is absorbed from a gas stream by a regenerable washing solution and in which the chemical consumption of the washing solution constituents is substantially reduced or eliminated.

Further objects, advantages and features of the invention will become apparent to those skilled in the art from the following description when taken in conjunction with the accompanying drawings.

SUMMARY OF THE INVENTION

Briefly, the invention provides a hydrogen sulfide removal and conversion method in which a hydrogen sulfide-containing gas stream is contacted with a quinone-containing aqueous washing solution so as to absorb the hydrogen sulfide. The absorbed hydrogen sulfide is converted to elemental sulfur by reaction with constituents of the washing solution. Thereafter, the washing solution is oxidatively regenerated and the product sulfur is separated from the regenerated washing solution.

The novel washing solution introduced into contact with the hydrogen sulfide-containing gas stream in the method of this invention is an aqueous solution having a pH between about 5 and about 10 and containing (1) solubilized vanadium, (2) one or more water-soluble quinones capable of solubilizing tetravalent vanadium, (3) thiocyanate ions, and (4) a water-soluble carboxylate complexing agent. The washing solution has a molar ratio of vanadium to quinone(s) above about 15, which molar ratio is selected to substantially reduce or eliminate the formation of contaminant sulfate salts.

The method of this invention substantially reduces or eliminates the undesirable conversion of hydrogen sulfide and/or product sulfur to water-soluble sulfur-containing salts which would otherwise contaminate the washing solution, and also substantially reduces or eliminates the chemical consumption of the constituents of the washing solution. The method produces a sulfur product which is relatively pure and more easily washed than the sulfur produced by prior art methods.

BRIEF DESCRIPTION OF THE DRAWINGS

The invention will be more readily understood by reference to the drawings, wherein like numerals refer to like elements, and in which.

DETAILED DESCRIPTION OF THE INVENTION

The method of this invention is suitable for removing hydrogen sulfide from a wide variety of hydrogen sulfide-containing gas streams, including hydrogen sulfide-containing gas streams generated as a result of the refining of petroleum, the sweetening of sour natural gas, the processing of ores, the destructive distillation of coal and/or oil shale, the gasification or liquefaction of coal, the use of geothermal fluids to generate electricity, or other processes which produce hydrogen sulfide-containing gases. The method of this invention can successfully treat gas streams containing less than one mole percent hydrogen sulfide as well as gas streams containing up to 80 mole percent hydrogen sulfide or more. One such hydrogen sulfide-containing gas stream is the gas produced by hydrogenation and hydrolysis of a Claus process tail gas as disclosed in U.S. Pat. No. 3,752,877 to Beavon, the disclosure of which is herein incorporated by reference. Hydrogenated Claus process tail gas typically contains from about 0.5 to about 5 mole percent hydrogen sulfide, from about 2 to about 15 mole percent carbon dioxide, from about 5 to about 30 mole percent water and traces of methane, carbonyl sulfide and methyl mercaptan, with the remainder being nitrogen.

Figure 1:
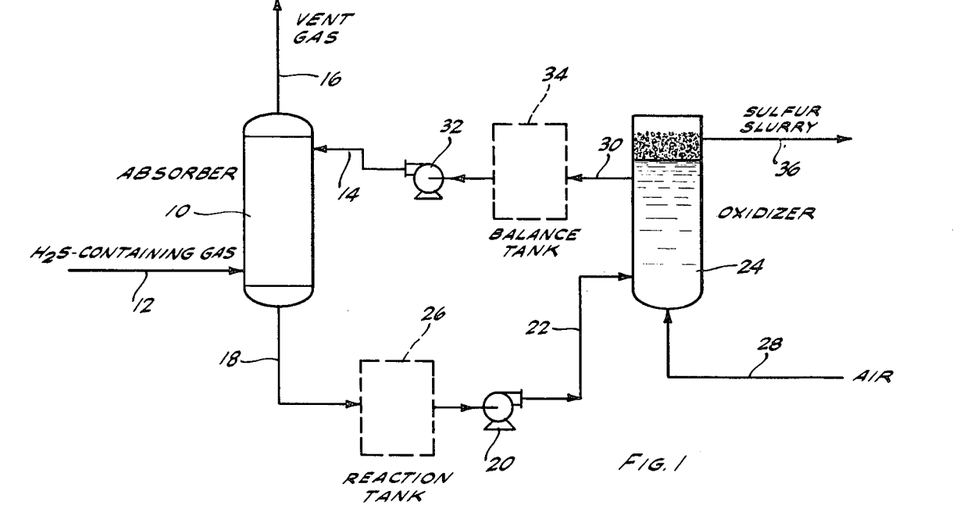
FIG. 1 is a schematic flow diagram illustrating the manner in which a hydrogen sulfide-containing gas is treated by one embodiment of the method of this invention.

FIG. 1 schematically illustrates the process equipment employed in one embodiment of the method of this invention. The hydrogen sulfide-containing gas is introduced through conduit 12 into the bottom of absorber 10 and flows upwardly through absorber 10 in countercurrent contact with a washing solution introduced through conduit 14 into the top of absorber 10. Substantially all of the hydrogen sulfide is absorbed from the gas by the downwardly flowing solution to thereby form a vent gas which is substantially free of hydrogen sulfide. The vent gas is discharged through conduit 16 to the atmosphere. While an absorber employing counter-current flow of the hydrogen sulfide-containing gas and the washing solution has been described, other known gas/liquid contacting vessels, such as a venturi scrubber employing cocurrent flow of the gas and washing solution, may be successfully employed in the method of this invention. Suitable gas/liquid scrubbers include single and multistage contacting vessels using countercurrent and/or cocurrent flow of the gas stream and the washing solution.

Once absorbed by the washing solution, the hydrogen sulfide is oxidatively converted to elemental sulfur by reaction with the constituents of the washing solution. The reduced washing solution and entrained elemental sulfur are withdrawn from absorber 10 via conduit 18 and are pumped by pump 20 through conduit 22 into the bottom of oxidizer 24. Prior to introduction of the reduced solution into oxidizer 24, sufficient time should be allowed for complete conversion of the absorbed hydrogen sulfide to elemental sulfur. Typically this conversion is completed in about five minutes and sufficient residence time can be provided by briefly holding the reduced solution in the bottom of absorber 10. Optionally, reaction tank 26 is provided between absorber 10 and oxidizer 24, if required, in order to allow sufficient reaction time for the complete conversion of the absorbed hydrogen sulfide to elemental sulfur.

The reduced washing solution and entrained sulfur introduced through conduit 22 into oxidizer 24 are contacted with air, or other molecular oxygen-containing gas, introduced through conduit 28 into the bottom of oxidizer 24. The entering air is preferably churned into small bubbles by a submerged rotating stirrer, not shown, adapted for this purpose. The reduced washing solution is oxidized by reaction with oxygen thereby regenerating the constituents of the washing solution. The air also serves to float the sulfur particles entering oxidizer 24 and thereby form a frothy sulfur slurry at the top of oxidizer 24. The regenerated washing solution is withdrawn from oxidizer 24 via conduit 30 and is recycled by pump 32 through conduit 14 to the top of absorber 10. Optionally, balance tank 34 is provided as an accumulator or surge tank for the regenerated washing solution. The sulfur slurry, which contains from about 3 to about 20 weight percent of elemental sulfur as well as entrained air and washing solution, is withdrawn from oxidizer 24 via conduit 36. The product sulfur is then separated from the sulfur slurry.

Figure 2:
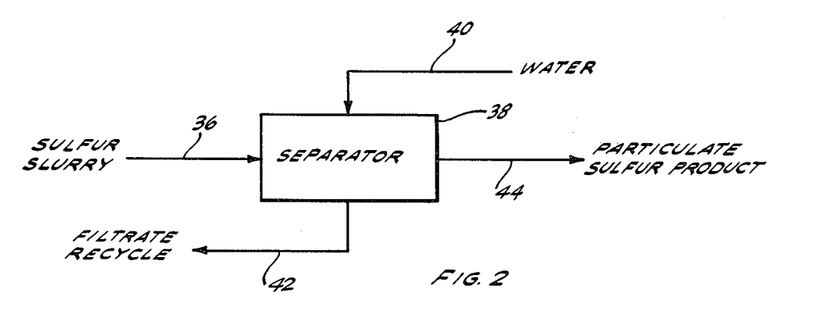
FIGS. 2 and 3 are schematic flow diagrams illustrating preferred methods for separating the product sulfur from the sulfur slurry produced in the method of this invention.

FIG. 2 illustrates one preferred method for separating the product sulfur from the sulfur slurry withdrawn from the oxidizer of FIG. 1. The sulfur slurry is fed through conduit 36 into separator 38, which can be a filter, a centrifuge or other device capable of separating particulate sulfur from an aqueous slurry containing the same in a manner equivalent to a filter or a centrifuge. As explained more fully hereinbelow, separator 38 is preferably not an autoclave or other device which requires excessive heating of the sulfur slurry to effect separation of the product sulfur. The separated sulfur is preferably washed with water introduced into separator 38 via conduit 40, and the filtrate comprised of the eluted washing solution and wash water is withdrawn from separator 38 via conduit 42 for recycle to the circulating washing solution, such as by recycle of the filtrate to balance tank 34. The sulfur product is withdrawn from separator 38 via conduit 44 as a relatively dry cake comprised of finely divided sulfur particles. The particulate sulfur product produced in this manner by the method of this invention is relatively pure and generally is suitable for agricultural use without further purification.

Figure 3:
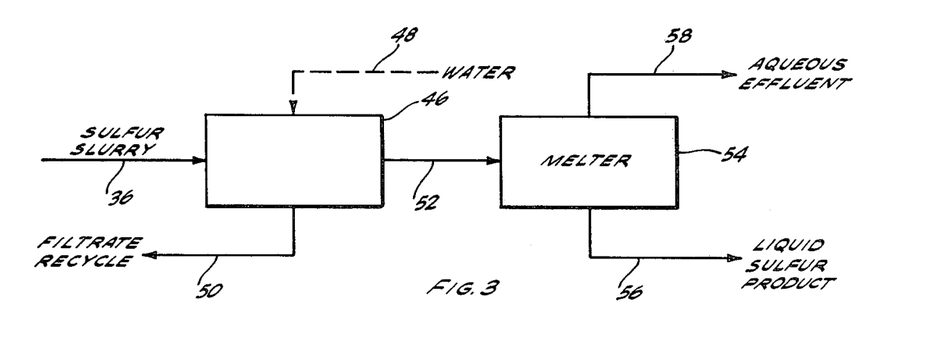

FIG. 3 illustrates another method for separating the product sulfur from the sulfur slurry, which method is preferred when a liquid sulfur product is desired. The sulfur slurry is fed through conduit 36 into separator 46, which can be a filter, a centrifuge or the like as described above for separator 38. The separated sulfur may optionally be washed with water introduced through conduit 48 into separator 46, and the filtrate comprised of the eluted washing solution and wash water is withdrawn from separator 46 via conduit 50 for recycle to the circulating washing solution. Alternatively, only the eluted washing solution and little or no wash water may be recycled to the circulating washing solution. The separated sulfur is then reslurried with additional water introduced through conduit 48 to form a concentrated slurry having from about 3 to about 20 weight percent of sulfur, and the concentrated slurry is withdrawn from separator 46 and conducted through conduit 52 into melter 54. The concentrated slurry is heated in melter 54 to melt the sulfur and thereby form a liquid sulfur product which separates by gravity from the slurry water and is withdrawn from melter 54 through conduit 56. The aqueous effluent is withdrawn from melter 54 via conduit 58 for disposal.

Preferably sufficient water is employed to wash the product sulfur in separator 46 so as to remove the valuable non-sulfur constituents thereof from the sulfur and thereby reduce the loss of valuable chemicals in the aqueous effluent from melter 54. The aqueous effluent from melter 54 is preferably not recycled to the circulating washing solution because recycle of this effluent is often detrimental to the effectiveness of the method of this invention. Depending upon the degree of washing achieved in separator 46, the aqueous effluent from melter 54 may contain colloidal vanadium and/or thiosulfate and polythionate salts which tend to decrease the effectiveness of the circulating washing solution. Since these undesirable chemical species are to some extent produced whenever the washing solution is treated at the high temperatures employed in an autoclave or melter, it is preferred to dispose of the aqueous autoclave effluent rather than recycle it to the washing solution.

In the method of this invention, the washing solution is circulated between the reducing atmosphere of absorber 10 and the oxidizing atmosphere of oxidizer 24. During this circulation the composition of the washing solution will necessarily change to some extent due to the various chemical reactions involved in the method. However, the composition of the washing solution introduced into the top of absorber 10 will be substantially constant under normal operating conditions. All reference herein to the composition of the washing solution is made to the composition of the washing solution as introduced into contact with the hydrogen sulfide-containing gas stream.

The washing solution employed in the method of this invention is an aqueous solution containing (1) solubilized vanadium, (2) one or more water-soluble quinones capable of solubilizing tetravalent vanadium, (3) thiocyanate ions and (4) a water-soluble carboxylate complexing agent.

Preferably the solubilized vanadium is provided by dissolving a water-soluble vanadium-containing compound in the washing solution. Suitable vanadium-containing compounds include the alkali metal and ammonium vanadate salts, such as sodium metavanadate, sodium orthovanadate, sodium pyrovanadate, sodium ammonium vanadate and isopolyvanadate. The concentration of vanadium in the washing solution, calculated in terms of grams of elemental vanadium per liter of solution, is between about 0.3 and about 20 grams of vanadium per liter, preferably between about 0.5 and about 10 grams of vanadium per liter. In terms of gram-moles of vanadium per liter of solution, the corresponding concentrations are between about 0.006 and about 0.4 gram-moles of vanadium per liter, preferably between about 0.01 and about 0.2 gram-moles of vanadium per liter. Good results are obtained when the solution contains between about 2 grams (0.04 gram-moles) and about 8 grams (0.16 gram-moles) of vanadium per liter.

The washing solution introduced into contact with the hydrogen sulfide-containing gas stream also contains a water-soluble quinone or a mixture of water-soluble quinones capable of solubilizing tetravalent vanadium. The quinone or quinones present in the washing solution have a generalized formula:

(a para-quinone)     (an ortho-quinone)

wherein at least one of groups A, B, C and D is a water-solubilizing group or contains a water-solubilizing group which renders the quinone soluble in the washing solution. Suitable water-solubilizing groups include sulfonyl, carboxyl and hydroxy groups, and preferably the quinone has at least one sulfonyl group. The water-solubilizing group can be attached directly to the quinone nucleus or can be attached to an alkyl, an aryl, an alkylaryl group or the like attached to the quinone nucleus. The other of groups A, B, C or D, i.e., the groups other than the water-solubilizing group(s), can be hydrogen or other group which neither interferes with the water-solubility of the quinone, nor interferes with the ability of the quinone to complex with vanadium in the washing solution. For example, the other group can be a halo group, such as a chloro group, an alkyl group, an aryl group, an alkylaryl group or the like.

Typically the quinone present in the washing solution will have one of the following quinone nuclei:

The para-quinones are generally more resistant to chemical consumption than the ortho-quinones, and are therefore preferred.

Exemplary water-soluble quinones capable of solubilizing tetravalent vanadium in the washing solution of the method of this invention include: 1,4-naphthoquinone-2-sulfonate; 1,2-naphthoquinone-4-sulfonate; 1,4-anthraquinone-2-sulfonate; 1,2-anthraquinone-4-sulfonate; the 9,10-anthraquinone-x-sulfonates (wherein x=1 or 2); the x-carboxy-9,10-anthraquinone-y-sulfonates (wherein x=5, 6, 7 or 8 and y=1 or 2); the 9,10-anthraquinone-x,y-disulfonates (wherein x=1 or 2, and y=5, 6, 7 or 8); 1,4-phenanthraquinone-2-sulfonate; 1,2-phenanthraquinone-4-sulfonate; the 9,10-phenanthraquinone-x-sulfonates (wherein x=1, 2, 3 or 4); the 9,10-phenanthraquinone-x,y-disulfonates (wherein x=1, 2, 3 or 4, and y=5, 6, 7 or 8; and the water-soluble quinone derivatives thereof. Particularly preferred water-soluble quinones are the 9,10-anthraquinone-x,y-disulfonates (wherein x=1 or 2, and y=6 or 7); the x-carboxy-9,10-anthraquinone-y-sulfonates (wherein x=5, 6, 7 or 8 and y=1 or 2); 1,4-naphthoquinone-2-sulfonate; and the water-soluble quinone derivatives thereof.

The washing solution may contain a single quinone or a mixture of two or more quinones. The washing solution may also contain one or more water-soluble nonquinone aromatic compounds. Of the nonquinone aromatic compounds, the water-soluble nonquinone aromatic sulfonates, particularly the water-soluble nonquinone hydroxy aromatic sulfonates, are preferred. Suitable nonquinone aromatic compounds are disclosed in our copending application Ser. No. 50,192, filed June 20, 1979, now U.S. Pat. No. 4,283,379 the disclosure of which is herein incorporated by reference.

Preferred water-soluble nonquinone aromatic compounds include the alkali metal and ammonium salts and the acids of the following compounds: 1-hydroxybenzene-4-sulfonate; 1,4-dihydroxybenzene-2-sulfonates; the 1,4-dihydroxybenzene-2,x-disulfonates (wherein x=5 or 6); 4,5-dihydroxynaphthalene-2,7-disulfonate; pyridine-3-sulfonate; 8-hydroxyquinoline-5-sulfonate; and mixtures thereof.

In one preferred embodiment of the method of this invention, the washing solution contains one or more quinones and is substantially free of any water-soluble nonquinone aromatic compounds.

The concentration of quinone(s) in the washing solution is selected in view of, inter alia, the sulfur loading of the washing solution, the solubility of the quinone(s), the concentration (if any) of water-soluble nonquinone aromatic compounds in the washing solution, the concentration of vanadium in the washing solution, and the molar ratio of vanadium to quinone(s) which is required to substantially reduce or eliminate the formation of contaminant sulfate salts. The washing solution contains typically between about 0.0005 and about 0.05 gram-moles of quinone(s) per liter, preferably between about 0.001 and about 0.04 gram-moles of quinone(s) per liter, and more preferably between about 0.0015 and about 0.015 gram-moles of quinone(s) per liter. Good results are obtained when the washing solution contains between about 0.002 and about 0.005 gram-moles of quinone(s) per liter.

The thiocyanate ions in the washing solution are provided by dissolving a water-soluble thiocyanate salt, such as an alkali metal or ammonium thiocyanate, in the washing solution. Alternatively, one or more "thiocyanate ion precursors", such as an alkali metal or ammonium cyanide, may be dissolved in the washing solution and thereafter converted to thiocyanate ions by reaction with absorbed hydrogen sulfide. However, at least for the initial formulation of the washing solution it is preferred that an alkali metal or ammonium thiocyanate be dissolved in the washing solution to provide the thiocyanate ions. Calculated as grams of thiocyanate ions ($SCN^-$) per liter of solution, the washing solution contains between about 5 and about 400 grams of thiocyanate ions per liter, preferably between about 30 and about 150 grams of thiocyanate ions per liter. Good results are obtained when the washing solution contains between about 50 and about 75 grams of thiocyanate ions per liter.

The carboxylate complexing agent in the washing solution serves to maintain the solubility of vanadium in the presence of thiocyanate ions. The complexing agent preferably has at least two water-solubilizing groups, at least one of which is a carboxyl group. Preferably, the complexing agent contains at least one carboxyl group and at least one hydroxy group. Suitable carboxylate complexing agents include the water-soluble polycarboxylic acids and their salts, such as maleic acid, particularly those carboxylic acids and salts having at least one hydroxy group, such as citric acid, malic and/or tartaric acid, and the monohydroxy- or polyhydroxy monocarboxylic acids and their salts, such as glycolic acid. Citric acid and its water-soluble salts are particularly preferred carboxylate complexing agents.

The washing solution of this invention has a pH between about 5 and about 10, more preferably between about 7 and about 9.5. Good results are obtained when the washing solution has a pH between about 8 and about 9. The washing solution can be buffered at the desired pH by the use of conventional buffering agents, such as a weak carboxylic acid and an alkali metal or ammonium salt of the weak carboxylic acid. Alternatively, or in addition, the pH of the washing solution can be controlled by the addition of weak acids, such as carbon dioxide absorbed from the gas stream, and/or a base, such as sodium hydroxide. The alkali metal and ammonium carbonates and bicarbonates are preferred buffering agents, particularly mixtures of the alkali metal carbonates and bicarbonates. An exemplary washing solution has a pH between about 8 and about 9, and contains between about 5 and 10 grams of sodium carbonate per liter, between about 25 and about 30 grams of sodium bicarbonate per liter, and between about 10 and about 20 grams of sodium citrate per liter.

It has been discovered that presence of any significant amount of quinone, such as above about 0.0001 gram-moles of quinone per liter, in a regenerable washing solution employed to absorb hydrogen sulfide from a gas results in the formation of contaminant sulfate salts at an unacceptably high rate unless the quinone-containing washing solution has a molar ratio of vanadium to total quinones above about 15. As used herein the phase "quinone-containing washing solution" means a washing solution containing at least about 0.0001 gram-moles of quinone per liter. Vanadium forms complexes with quinone(s) in the solution, and it appears that the presence of any uncomplexed quinone in the solution results in the formation of sulfate salts. In any event, it has been found that the formation of sulfate salts can be substantially reduced or eliminated by using washing solutions having a molar ratio of vanadium to total quinone(s) above about 15. The minimum concentrations of vanadium and quinone(s) and the molar ratio therebetween are selected in view of the sulfur-loading of the washing solution to effect the desired degree of hydrogen sulfide removal and to reduce the sulfate formation rate to an acceptably low rate, respectively. The maximum molar ratio of vanadium in the washing compounds is primarily limited by the solubility of vanadium in the washing solution. At very high molar ratios excess vanadium may precipitate from the reduced washing solution. Preferably the washing solution has a molar ratio of vanadium to quinone(s) between about 20 and about 70.

During normal operations, the washing solutions of this invention are relatively resistant to chemical consumption of the solution constituents and do not tend to form or accumulate contaminants, such as thiosulfate and sulfate salts, at rates which require periodic replacement or bleeding of the washing solution. Preferably the washing solution initially charged to a plant, i.e., the virgin solution, contains the above-described essential constituents, is substantially free of thiosulfate salts and sulfate salts and has a molar ratio of vanadium to quinone(s) between about 20 and about 40. Depending upon the particular solution, sulfate salts may form at a relatively low and normally acceptable rate initially, such as about 0.0002 gram-moles per liter per day. The accumulated sulfate salts assist in maintaining the solubility of vanadium in the solution and thereby advantageously allow the use of higher vanadium to quinone(s) ratios in sulfate-containing solutions. The rate of sulfate formation is reduced essentially to zero when the washing solution contains between about 0.4 and about 0.6 gram-moles of sulfate salt per liter and has a molar ratio of vanadium to quinone(s) between about 30 and about 70.

The invention is further described by the following examples which are illustrative of specific modes of practicing the invention and are not intended as limiting the scope of the invention defined by the appended claims.

EXAMPLES 1–7

In each of Examples 1 through 7, a hydrogen sulfide-containing gas is contacted with a regenerable quinone-containing washing solution so as to absorb substantially all of the hydrogen sulfide into the washing solution; the absorbed hydrogen sulfide is converted to elemental sulfur by reaction with the constituents of the washing solution; the washing solution is oxidatively regenerated; and, after separation of the elemental sulfur, the regenerated solution is recycled into contact with the hydrogen sulfide-containing gas.

In Examples 1 and 2, the gas introduced into contact with the washing solution comprises between about 2 and about 3 mole percent of hydrogen sulfide, between about 32 and about 33 mole percent of carbon dioxide and about 65 mole percent of nitrogen. The washing solution is circulated into contact with the hydrogen sulfide-containing gas at a rate sufficient to provide about 0.19 liter of washing solution per liter (calculated at 60° F. and one atmopshere pressure) of the hydrogen sulfide-containing gas.

In Examples 3, 4, 6 and 7, the gas introduced into contact with the washing solution comprises about 1 mole percent of hydrogen sulfide, about 7 mole percent of carbon dioxide and about 92 mole percent of nitrogen. The washing solution is circulated into contact with the hydrogen sulfide-containing gas at a rate sufficient to provide about 0.037 liters of washing solution per liter (calculated at 60° F. and one atmosphere pressure) of the hydrogen sulfide-containing gas.

In Example 5, the gas introduced into contact with the washing solution comprises between about 6.2 and about 6.8 mole percent of hydrogen sulfide, and 45 mole percent of gaseous hydrocarbons, between about 24 and about 27 mole percent hydrogen, about 17 mole percent carbon dioxide, about 5 mole percent carbon monoxide and traces of other gaseous compounds. The washing solution is circulated into contact with the hydrogen sulfide-containing gas at a rate sufficient to provide about 0.14 liter of washing solution per liter (calculated at 60° F. and one atmosphere pressure) of the hydrogen sulfide-containing gas.

In each example, the washing solution is periodically sampled over a period of at least 5 days in order to detect changes in the concentrations of the various constituents of the solution. The compositions of the washing solutions during these tests are indicated in Tables I and II below.

TABLE I

| EXAMPLE NO. | 1 | 2 | 3 | 4 |
|---|---|---|---|---|
| Run Length, Days | 10 | 13 | 13 | 16.4 |
| Constituent Concentrations, gm/l | | | | |
| Vanadium | 2.8 | 2.5 | 4.9 | 6.2 |
| ADA, Disodium Salt | 11 | 2.5 | 1.5 | 0.9 |
| Sodium Thiocyanate | 115 | 110 | 95 | 86 |
| Sodium Citrate | 13 to 24 | 4 to 13 | 7 to 13 | 10 to 15 |
| Sodium Carbonate Equivalent[a] | 40 | 21 | 23 | 25 |
| Sodium Thiosulfate | <0.2 | <0.2 | <0.2 | <0.2 |
| Sodium Sulfate[b] | 4.6 to 7.9 | 0.7 to 5.7 | 1.8 to 2.1 | 82 |
| Rate of Gain (Loss), gm/l/day | | | | |
| Vanadium | 0.0 | 0.0 | 0.0 | 0.0 |
| ADA, Disodium Salt | 0.0 | 0.0 | 0.0 | 0.0 |
| Sodium Citrate | (0.4) | (0.7) | (0.7) | (0.3) |
| Sodium Carbonate Equivalent | 0.0 | 0.0 | 0.0 | 0.0 |
| Sodium Thiosulfate | 0.0 | 0.0 | 0.0 | 0.0 |
| Sodium Sulfate | 0.36 | 0.39 | 0.05 | 0.0 |
| Vanadium to ADA Molar Ratio: | 2.1 | 8.1 | 28 | 56 |
| Absorbed $H_2S$ Converted To: | | | | |
| Thiosulfate Salts | 0.0% | 0.0% | 0.0% | 0.0% |
| Sulfate Salts | 1.7% | 1.8% | 0.2% | 0.0% |
| Total Sulfur-Containing Salts | 1.7% | 1.8% | 0.2% | 0.0% |

[a]Sodium Carbonate Equivalent equals the sodium carbonate concentration plus 0.631 times the sodium bicarbonate concentration.
[b]The initial amounts of sodium sulfate in Examples 1, 2, 3 and 5 are introduced as an impurity in the ADA. The initial amounts of sodium sulfate in Examples 4 and 7 include about 80 and about 40 grams per liter which is added in addition to the sodium sulfate introduced as an impurity with the ADA.

TABLE II

| EXAMPLE NO. | 5 | 5 | 7 |
|---|---|---|---|
| Run Length, Days | 7 | 5 | 7 |
| Constituent Concentrations, gm/l | | | |
| Vanadium | 2.6 | 4.2 to 3.9 | 4.1 to 3.7 |
| ADA, Disodium Salt | 3.0 to 2.0 | 2.3 to 2.0 | 2.4 |
| Sodium Thiocyanate | — | — | 92 |
| Sodium Citrate | — | 20 to 3.3 | — |
| Sodium Carbonate Equivalent | 17 to 12 | 13 to 5.8 | 23 to 6.2 |
| Sodium Thiosulfate | 0.0 to 2.2 | 0.0 to 27 | 0.0 to 22 |
| Sodium Sulfate | 1.5 to 4.3 | N.D.[c] | 42 to 44 |
| Rate of Gain (Loss), gm/l/day | | | |
| Vanadium | 0.0 | (0.07) | (0.06) |
| ADA, Disodium Salt | (0.14) | (0.07) | 0.0 |
| Sodium Citrate | — | (1.7) | — |
| Sodium Carbonate Equivalent | (0.71) | (4.1) | (3.2) |
| Sodium Thiosulfate | 0.34 | 5.3 | 4.2 |
| Sodium Sulfate | 0.40 | N.D.[c] | 0.3 |
| Vanadium to ADA Molar Ratio: | 7.1 to 10.7 | 14.7 to 15.5 | 13.9 to 13.2 |
| Absorbed $H_2S$ Converted To: | | | |
| Thiosulfate Salts | 3% | 40.8% | 32.3% |
| Sulfate Salts | 2% | N.D. | 1.3% |
| Total Sulfur-Containing Salts | 5% | >40.8% | 33.6% |

[c]N.D. means not determined.

A comparison of the results of Examples 1–7 demonstrates the criticality of having solubilized vanadium, one or more water-soluble aromatic compounds, thiocyanate ions, carboxylate complexing agent and a high molar ratio of vanadium to quinone(s) in a quinone-containing washing solution. The washing solutions of Examples 5, 6 and 7 do not contain one or both of the critical thiocyanate ions and carboxylate complexing agent constituents; as a result sulfur solubilization and chemical consumption of the valuable constituents are undesirably high. Although the washing solutions of Examples 1 and 2 contain the same ingredients as the washing solutions of Examples 3 and 4, sulfur solubilization (in the form of sulfate salt production) is still undesirably high due to the relatively low molar ratios of vanadium to quinones employed in Examples 1 and 2.

By way of contrast, the results of Examples 3 and 4 in which relatively high molar ratios of vanadium to quinone(s) are employed demonstrate a substantial reduction in chemical consumption of the valuable constituents. Only the carboxylate complexing agent is chemically consumed. Further, Example 3 demonstrates a substantial reduction in the rate of sulfate formation and, in Example 4, no sulfur solubilization of any kind is detected.

EXAMPLE 8

A hydrogen sulfide-containing gas is contacted with a washing solution so as to absorb substantially all of the hydrogen sulfide into the washing solution; the absorbed hydrogen sulfide is converted to elemental sulfur by reaction with the constituents of the washing solution; the washing solution is oxidatively regenerated; and, after separation of the elemental sulfur, the regenerated solution is recycled into contact with the hydrogen sulfide-containing stream. The gas introduced into contact with the washing solution comprises about 1 mole percent of hydrogen sulfide, about 7 mole percent of carbon dioxide and about 92 percent of nitrogen. The washing solution is circulated into contact with the hydrogen sulfide-containing gas at a rate sufficient to provide about 0.037 liters of washing solution per liter (calculated at 60° F. and one atmosphere pressure) of the hydrogen sulfide-containing gas.

The washing solution is periodically sampled over a period of about 16.8 days in order to detect changes in the concentrations of the various constituents of the solution. The composition of the washing solution during this test is indicated in Table III below.

TABLE III

| EXAMPLE NO. | 8 |
|---|---|
| Run Length, Days | 16.8 |
| Constituent Concentrations, gm/l | |
| Vanadium | 4.2 |
| ADA, Disodium Salt | 1.4 |
| PSA, Sodium Salt[d] | 22 |
| Sodium Thiocyanate | 87 |
| Sodium Citrate | 16 to 13 |
| Sodium Carbonate Equivalent[a] | 24 |

TABLE III-continued

| EXAMPLE NO. | 8 |
|---|---|
| Sodium Thiosulfate | <0.2 |
| Sodium Sulfate[e] | 1.3 to 2.6 |
| Rate of Gain (Loss), gm/l/day | |
| Vanadium | 0.0 |
| ADA, Disodium Salt | 0.0 |
| PSA, Sodium Salt | 0.0 |
| Sodium Citrate | (0.16) |
| Sodium Carbonate Equivalent | 0.0 |
| Sodium Thiosulfate | 0.0 |
| Sodium Sulfate | 0.07 |
| Molar Ratios: | |
| Vanadium/ADA | 24 |
| Vanadium/PSA | 0.74 |
| Absorbed H₂S Converted To: | |
| Thiosulfate Salts | 0.0% |
| Sulfate Salts | 0.3% |
| Total Sulfur-Containing Salts | 0.3% |

[a]Sodium Carbonate Equivalent equals the sodium carbonate concentration plus 0.631 times the sodium bicarbonate concentration.
[d]"PSA, Sodium Salt" refers to the sodium salt of 1-hydroxybenzene-4-sulfonic acid, i.e., phenolsulfonic acid.
[e]The initial amount of sodium sulfate in Example 8 is introduced as an impurity with the ADA and PSA.

While particular embodiments of the invention have been described, it will be understood, of course, that the invention is not limited thereto since many obvious modifications can be made, and it is intended to include within this invention any such modifications as will fall within the scope of the appended claims.

Having now described the invention, we claim:

1. A method for removing hydrogen sulfide from a hydrogen sulfide-containing gas stream and converting said hydrogen sulfide to elemental sulfur, which comprises:
    (a) contacting said gas stream with a regenerable quinone-containing washing solution so as to absorb said hydrogen sulfide into said washing solution, the washing solution introduced into contact with said gas stream comprising an aqueous solution having a pH between about 5 and about 10 and containing (1) solubilized vanadium, (2) one or more water-soluble quinones, (3) thiocyanate ions and (4) a water-soluble carboxylate complexing agent, said washing solution having a selected molar ratio of said vanadium to said quinones above about 15, said molar ratio being selected to substantially reduce the formation of contaminant sulfate salts;
    (b) allowing the absorbed hydrogen sulfide to react with constituents of said washing solution so as to convert said absorbed hydrogen sulfide substantially exclusively to elemental sulfur;
    (c) oxidatively regenerating the washing solution from step (b) so as to form a regenerated washing solution; and
    (d) separating said elemental sulfur from said washing solution.

2. The method defined in claim 1 wherein the washing solution introduced into contact with said gas stream contains between about 5 and about 400 grams of said thiocyanate ions per liter, between about 0.006 and about 0.4 gram-moles of said vanadium per liter, and between about 0.001 and about 0.04 gram-moles of said quinones per liter.

3. The method defined in claim 1 wherein the washing solution introduced into contact with said gas stream contains between about 30 and about 150 grams of thiocyanate ions per liter, between about 0.01 and about 0.2 gram-moles of vanadium per liter, and between about 0.0015 and about 0.015 gram-moles of said quinones per liter.

4. The method defined in claim 1 wherein the washing solution introduced into contact with said gas stream, contains between about 50 and about 75 grams of thiocyanate ions per liter, between about 0.04 and about 0.16 gram-moles of vanadium per liter, and between about 0.002 and about 0.005 gram-moles of said quinones per liter.

5. The method defined in claim 1 wherein said washing solution has a molar ratio of said vanadium to said quinones between about 20 and about 70.

6. The method defined in claim 1 wherein said washing solution is substantially free of sulfate salts and has a molar ratio of said vanadium to said quinones between about 20 and about 40.

7. The method defined in claim 1 wherein said washing solution contains water-soluble sulfate salts and has a molar ratio of said vanadium to said quinones between about 30 and about 70.

8. The method defined in claim 1 wherein said washing solution has a pH between about 7 and about 9.5.

9. The method defined in claim 1 wherein said carboxylate complexing agent is an alkali metal or ammonium salt of a hydroxycarboxylic acid, and wherein said washing solution further contains a buffering agent selected from the group consisting of the alkali metal and ammonium carbonates, the alkali metal and ammonium bicarbonates, the alkali metal and ammonium salts of carboxylic acids and mixtures thereof.

10. The method defined in claim 1 wherein said carboxylate complexing agent is an alkali metal or ammonium salt of citric acid.

11. The method defined in claim 1 wherein said one or more quinones is selected from the group consisting of 1,4-naphthoquinone-2-sulfonate, 1,2-naphthoquinone-4-sulfonate, 1,4-anhraquinone-2-sulfonate, 1,2-anthraquinone-4-sulfonate, the 9,10-anthraquinone-x-sulfonates (wherein x=1 or 2), the x-carboxy-9,10-anthraquinone-y-sulfonates (wherein x=5, 6, 7 or 8 and y=1 or 2), the 9,10-anthraquinone-x,y-disulfonates (wherein x=1 or 2, and y=5, 6, 7 or 8), 1,4-phenanthraquinone-2-sulfonate, 1,2-phenanthraquinone-4-sulfonate, the 9,10-phenanthraquinone-x-sulfonates (wherein x=1 or 2), the 9,10-phenanthraquinone-x,y-disulfonates (wherein x=1 or 2, and y=5, 6, 7 or 8), the water-soluble quinone derivatives thereof, and mixtures thereof.

12. The method defined in claim 1 wherein said one or more quinones is selected from the group consisting of the 9,10-anthraquinone-x,y-disulfonates (wherein x=1 or 2, and y=6 or 7), the x-carboxy-9,10-anthraquinone-y-sulfonates (wherein x=5, 6, 7 or 8, and y=1 or 2), 1,4-naphthoquinone-2-sulfonate, the water-soluble quinone derivatives thereof, and mixtures thereof.

13. The method defined in claim 1 wherein said one or more quinones consists essentially of a 9,10-anthraquinone-x,y-disulfonate (wherein x=1 or 2, and y=6 or 7), a water-soluble quinone derivative thereof or mixtures thereof.

14. The method defined in any one of claims 1 through 13 wherein said washing solution is substantially free of water-soluble nonquinone aromatic compounds.

15. A method for removing hydrogen sulfide from a hydrogen sulfide-containing gas stream and converting said hydrogen sulfide to elemental sulfur, which comprises:
(a) contacting said gas stream with a regenerable quinone-containing washing solution so as to absorb said hydrogen sulfide into said washing solution, said washing solution comprising an aqueous solution having a pH between about 7 and about 9.5 and containing (1) between about 0.006 and about 0.4 gram-moles of solubilized vanadium per liter, (2) between about 0.001 and about 0.04 gram-moles of one or more water-soluble quinones capable of solubilizing tetravalent vanadium per liter, (3) between about 30 and about 150 grams of thiocyanate ions per liter, and (4) a water-soluble carboxylate complexing agent; said one or more quinones being selected from the group consisting of 1,4-naphthoquinone-2-sulfonate, 1,2-naphthoquinone-4-sulfonate, 1,4-anthraquinone-2-sulfonate, 1,2-anthraquinone-4-sulfonate, the 9,10-anthraquinone-x-sulfonates (wherein $x=1$ or 2), the x-carboxy-9,10-anthraquinone-y-sulfonates (wherein $x=5$, 6, 7 or 8 and $y=1$ or 2), the 9,10-anthraquinone-x,y-disulfonates (wherein $x=1$ or 2, and $y=5$, 6, 7 or 8), 1,4-phenanthraquinone-2-sulfonate, 1,2-phenanthraquinone-4-sulfonate, the 9,10-phenanthraquinone-x-sulfonates (wherein $x=1$ or 2), the 9,10-phenanthraquinone-x,y-disulfonates (wherein $x=1$ or 2, and $y=5$, 6, 7 or 8), the water-soluble quinone derivaties thereof, and mixtures thereof, and said washing solution having a molar ratio of said vanadium to said quinones between about 20 and about 70;
(b) allowing the absorbed hydrogen sulfide to react with constituents of said washing solution so as to convert said hydrogen sulfide substantially exclusively to elemental sulfur;
(c) oxidatively regenerating the washing solution from step (b) so as to form a regenerated washing solution;
(d) separating said elemental sulfur from said regenerated washing solution; and
(e) recycling the regenerated washing solution from step (d) into contact with said gas stream in step (a).

16. The method defined in claim 15 wherein said washing solution contains between about 0.01 and about 0.2 gram-moles of vanadium per liter, between about 0.0015 and about 0.015 gram-moles of said quinones per liter, and between about 50 and about 75 grams of thiocyanate ions per liter.

17. The method defined in claim 15 wherein said washing solution is substantially free of sulfate salts and has a molar ratio of said vanadium to said quinones between about 20 and about 40.

18. The method defined in claim 15 wherein said washing solution contains between about 0.4 and about 0.6 gram-moles of sulfate salts per liter, and has a molar ratio of said vanadium to said quinones between about 30 and about 70.

19. The method defined in claim 15 wherein said complexing agent is an alkali metal salt of a hydroxycarboxylic acid, and wherein said washing solution further contains a buffering agent selected from the group consisting of the alkali metal carbonates, the alkali metal bicarbonates and mixtures thereof.

20. The method defined in claim 15 wherein said carboxylate complexing agent is an alkali metal salt of citric acid.

21. The method defined in claim 15 wherein said one or more quinones is selected from the group consisting of the 9,10-anthraquinone-x,y-disulfonates (wherein $x=1$ or 2 and $y=6$ or 7), the x-carboxy-9,10-anthraquinone-y-sulfonates (wherein $x=5$, 6, 7 or 8 and $y=1$ or 2), 1,4-naphthaquinone-2-sulfonate and mixtures thereof.

22. The method defined in any one of claims 15 through 21 wherein said washing solution is substantially free of water-soluble nonquinone aromatic compounds.

23. A method for removing hydrogen sulfide from a hydrogen sulfide-containing gas stream and converting said hydrogen sulfide to elemental sulfur, which comprises:
(a) contacting said gas stream with a regenerable quinone-containing washing solution so as to absorb said hydrogen sulfide into said washing solution, said washing solution comprising an aqueous alkaline solution having a pH between about 7 and about 9.5 and containing (1) between about 0.006 and about 0.4 gram-moles of solubilized vanadium per liter, (2) between about 0.0015 and about 0.015 gram-moles of one or more water-soluble quinones selected from the group consisting of the 9,10-anthraquinone-x,y-disulfonates (wherein $x=1$ or 2, and $y=6$ or 7) and the water-soluble quinone derivatives thereof, (3) between about 30 and about 150 grams of thiocyanate ions per liter, (4) a mixture of alkali metal carbonates and alkali metal bicarbonates, and (5) an alkali metal salt of hydroxycarboxylic acid, said washing solutin being substantially free of water-soluble nonquinone aromatic compounds and having a molar ratio of said vanadium to said quinones between about 20 and about 70;
(b) allowing the absorbed hydrogen sulfide to react with the constituents of said washing solution so as to convert said hydrogen sulfide substantially exclusively to elemental sulfur;
(c) oxidatively regenerating the washing solution from step (b) so as to form a regenerated washing solution;
(d) separating said elemental sulfur from said regenerated washing solution; and
(e) recycling the regenerated washing solution from step (d) into contact with said gas stream in step (a).

24. The method defined in claim 23 wherein said one or more quinones consists essentially of an alkali metal salt of a 9,10-anthraquinone-x,y-disulfonic acid (wherein $x=1$ or 2, and $y=6$ or 7) or mixtures thereof, which is present in said washing solution in an amount between about 0.002 and about 0.005 gram-moles per liter, and wherein said washing solution contains between about 50 and about 75 grams of thiocyanate ions per liter, between about 0.01 and about 0.2 gram-moles of vanadium per liter, between about 5 and about 10 grams of sodium carbonate per liter, between about 25 and about 30 grams of sodium bicarbonate per liter, and between about 10 and about 20 grams of sodium citrate per liter.

25. The method defined in claim 23 or 24 wherein said washing solution is substantially free of sulfate salts and has a molar ratio of said vanadium to said quinones between about 20 and about 40.

26. The method defined in claim 23 or 24 wherein said washing solution contains between about 0.4 and about 0.6 gram-moles of water-soluble sulfate salts per liter, and has a molar ratio of said vanadium to said quinones between about 30 and about 70.

27. A method for removing hydrogen sulfide from a hydrogen sulfide-containing gas stream and converting said hydrogen sulfide to elemental sulfur, which comprises:
  (a) contacting said gas stream with a regenerable quinone-containing washing solution so as to absorb said hydrogen sulfide into said washing solution, said washing solution comprising an aqueous alkaline solution having a pH between about 8 and about 9 and containing (1) between about 0.04 and about 0.16 gram-moles of solubilized vanadium per liter, (2) between about 30 and about 150 grams of thiocyanate ions per liter, (3) a mixture of alkali metal carbonates and alkali metal bicarbonates, (4) an alkali metal citrate, and (5) between about 0.002 and about 0.005 gram-moles per liter of one or more quinones selected from the group consisting of the alkali metal 9,10-anthraquinone-x,y-disulfonates (wherein x=1 or 2, and y=6 or 7), said washing solution being essentially free of water-soluble nonquinone aromatic compounds and having a molar ratio of said vanadium to said quinones between about 20 and about 70;
  (b) allowing the absorbed hydrogen sulfide to react with the constituents of said washing solution so as to convert said hydrogen sulfide substantially exclusively to elemental sulfur;
  (c) oxidatively regenerating the washing solution from step (b) so as to form a regenerated washing solution;
  (d) separating said elemental sulfur from said regenerated washing solution; and
  (e) recycling the regenerated washing solution from step (d) into contact with said gas stream in step (a).

28. The method defined in claim 27 wherein said washing solution contains between about 5 and about 10 grams of sodium carbonate per liter, between about 25 and about 30 grams of sodium bicarbonate per liter, and between about 10 and about 20 grams of sodium citrate per liter.

29. The method defined in claim 27 or 28 wherein said washing solution is substantially free of sulfate salts and has a molar ratio of said vanadium to said quinones between about 20 and about 40.

30. The method defined in claim 27 or 28 wherein said washing solution contains between about 0.4 and about 0.6 gram-moles of sulfate salts per liter, and has a molar ratio of said vanadium to said quinones between about 30 and about 70.

* * * * *